Sept. 8, 1925.　　　　　　　　　　　　　　　　　　　1,552,928
D. S. HERSHON
APPARATUS FOR REMOVING TIRES FROM THE WHEELS OF MOTOR VEHICLES
Filed April 2, 1920

INVENTOR
David S. Hershon
by Jas. H. Churchill
atty.

Patented Sept. 8, 1925.

1,552,928

UNITED STATES PATENT OFFICE.

DAVID S. HERSHON, OF CAMBRIDGE, MASSACHUSETTS.

APPARATUS FOR REMOVING TIRES FROM THE WHEELS OF MOTOR VEHICLES.

Application filed April 2, 1920. Serial No. 370,704.

*To all whom it may concern:*

Be it known that I, DAVID S. HERSHON, a citizen of the United States, residing in Cambridge, in the county of Middlesex and State of Massachusetts, have invented an Improvement in Apparatus for Removing Tires from the Wheels of Motor Vehicles, of which the following description, in connection with the accompanying drawings, is a specification, like characters on the drawings representing like parts.

This invention relates to apparatus for removing the tires of motor vehicles from the rims thereof and has for its object to provide a simple and highly efficient apparatus for this purpose.

To this end the apparatus is provided with a pusher to engage the tire on the rim while the latter is held stationary, and with means for rotating the pusher around the tire and for simultaneously moving the tire transversely with relation to said rim to force the tire off therefrom. Provision is made for adjusting the pusher to the tire.

These and other features of this invention will be pointed out in the claims at the end of this specification.

Figure 1:
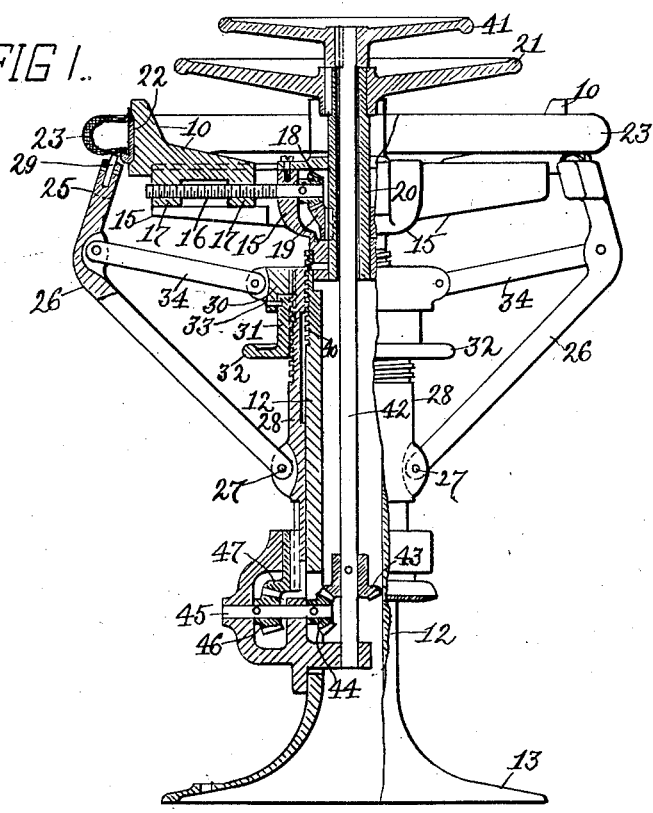

Fig. 1 is an elevation with parts in section of an apparatus embodying this invention.

Figure 2:
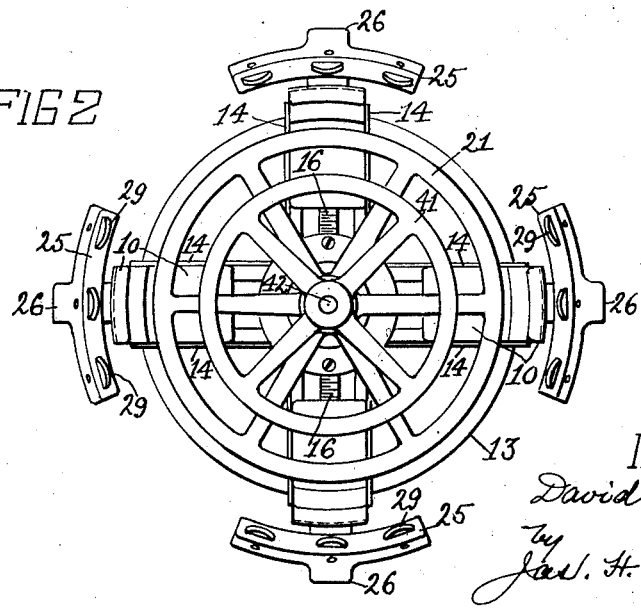

Fig. 2, a plan view of the apparatus shown in Fig. 1.

The apparatus herein shown as embodying this invention comprises means for supporting and securing the rim of the wheel in fixed position, devices for engaging the tire on said rim, and means for moving said devices to push the tire off of the rim.

The means for supporting and securing the rim of the wheel in fixed position consist as herein shown of a plurality of blocks or members 10, herein shown as four in number and radially movable with relation to a central, hollow upright or standard 12 provided with a suitable base 13. Each block or member 10 is mounted to slide in tracks or ways 14 attached to a spider 15 supported by the hollow standard 12 and secured in fixed relation thereto in any suitable manner.

Each block or member 10 is reciprocated by a screw or threaded shaft 16, which engages threaded openings in arms 17 depending from said block or member.

The shaft 16 is supported by the spider 15 and is provided with a bevel pinion 18 which meshes with a bevel gear 19 keyed to a hollow spindle or shaft 20 provided with a removable hand wheel 21. By turning the hand wheel 21 in one direction, the blocks or members 10 may be moved on their guideways or tracks 14 outwardly into position to have the rim 22 placed onto and supported by the blocks or members 10, and when the rim 22 has been placed over the blocks or members 10, the latter may be moved outwardly still further to firmly secure the said rim in fixed position. The rim 22 with the tire 23 thereon is now ready to have the tire removed therefrom. For this purpose, devices for pushing the tire off of the rim are provided. In the present instance, four devices are shown, which are arranged about the standard or upright 12 on the quarter, and each device is shown as a curved bar 25 attached to a bent lever or arm 26, which is pivoted at its lower end as at 27 to a sleeve 28 mounted on the hollow standard or support 12 to rotate thereon and to be moved lengthwise thereof.

The levers or arms 26 are pivoted to move in a vertical plane, and the bars 25 extend transversely of said levers or arms and constitute one form of pusher or tire-disengaging device, each of which may be provided with rollers or wheels 29 to present a rounded surface for engagement with the tire 23.

Provision is made for positioning the pushing devices with relation to the tire to the best advantage, and to this end, means for adjusting the pushers with relation to the tire and rim are provided.

The adjusting means herein shown consist of a collar or sleeve 30, which is loosely mounted on the sleeve 28 to be moved longitudinally thereon by a nut 31 provided with a hand wheel 32, which is in threaded engagement with the sleeve 28 and is fastened to said collar by a pin 33 or otherwise so that the nut can rotate with relation to the collar 30 and pin 33, and said collar is connected by links 34 with the levers or arms 26.

It will thus be seen that by turning the nut 31, so that it is moved upward on the sleeve 28, the collar 30 through the links 34 will turn the levers 26 outward and move the pushers 25 downward and away from the tire 23, and by turning the nut 31 in the opposite direction, the collar 30 is moved downward on the sleeve 28, and acting through the links 34 moves the levers 26 and the pushers 25 inwardly and upwardly and brings the pushers into engagement with the tire 23 as shown in Fig. 1, and into the proper or desired position with relation to the rim 22 for the effective removal of the tire, which removal is accomplished by turning the sleeve 28 in the proper direction to move it upwardly on the hollow standard, and thereby cause the pushers 25 to push the tire off of the rim.

The sleeve 28 is in threaded engagement with the threaded portion 40 of the hollow standard and may be rotated on the latter by turning a hand wheel 41 on a center shaft or spindle 42, which is extended through the hollow shaft 20 into the hollow standard and is suitably supported at its lower end and is provided with a bevel pinion 43 which meshes with a bevel pinion 44 on a shaft 45 provided with a bevel pinion 46 which meshes with a bevel gear 47 splined to the sleeve 28 so as to rotate the latter and permit longitudinal movement of said sleeve on said hollow standard independently of the gear 47.

After the tire has been removed from the rim 22 as described, the hand wheel 41 is turned in the opposite direction to return the pushers to their normal position below and away from the rim, thereby leaving the latter free to have a new tire or the old tire after being repaired, placed on the rim. The machine or apparatus herein shown is especially useful in removing very heavy or large sizes of tires and especially those tires which are rusted onto the rim and are nearly impossible to remove by hand labor.

The hand wheels 21, 41, are preferably removable from their respective shafts or spindles and the spider 15 which supports the guideways or tracks 14 for the rim-supporting members or blocks 10, is located sufficiently below a horizontal plane through the rim-engaging member 10 to permit the machine to handle rims alone or the so-called artillery or other wheels.

The machine has been described for removing the tires, but it may also be employed for putting new tires on the rims when desired, by attaching to the pushers suitable hook-like devices, which could engage the outer or upper surface of the tire and pull the latter onto the rim, by turning the hand wheel 41 so as to move the sleeve 28 downward on the hollow standard 12.

It is not deemed necessary to show these hooked devices as they may be auxiliary devices normally removed from the machine but capable of being suitably connected with the pusher levers or arms when it is found necessary to use them.

The blocks or members 10 are removable and capable of being exchanged for others of different shapes to conform to the particular wheel or rim whose tire is to be removed.

One construction of apparatus embodying this invention is herein shown, but it is not desired to limit the invention to the particular construction shown.

Claims:

1. In a machine for removing tires, in combination, a hollow upright, guideways radiating therefrom, rim engaging members reciprocating in said guideways, rotatable shafts for reciprocating said members, a hollow shaft geared with said rotatable shafts, a sleeve in threaded engagement with said hollow upright, a rotatable spindle extended through said hollow shaft into said hollow upright, gearing connecting said spindle with said sleeve, levers pivoted to said sleeve, pusher members attached to said levers and capable of engaging the tire on said rim, a nut in threaded engagement with said sleeve, and means for connecting said nut with said levers.

2. In a machine for removing tires, in combination, means for engaging the rim of an automobile wheel to hold it in a stationary position, means for moving said means into and out of engagement with said rim, a pusher for engaging the tire on said rim, means for adjusting said pusher to engage the tire on said rim, and means for rotating said pusher about the rim having provision for simultaneously moving the pusher transversely of said rim to push the tire off of the rim while said pusher is being rotated about the rim.

3. In a machine for removing tires, in combination, a hollow upright, means carried by said hollow upright for engaging the rim of a wheel, a sleeve in threaded engagement with said hollow upright, a pusher for engaging the tire on said rim, means for connecting said pusher with said sleeve, a shaft extended into said hollow upright, and gearing connecting said shaft with said sleeve to effect movement of the pusher transversely with relation to said rim by rotation of said shaft.

4. In a machine for removing tires, in combination, a hollow upright, a hollow rotatable shaft in alignment with said hollow upright, devices for engaging the rim of a wheel, means for connecting said devices with said hollow shaft to move said devices into and out of engagement with said rim by rotation of said hollow shaft, a sleeve in threaded engagement with said hollow upright, a pusher to engage the tire on said rim, means for operatively connecting said pusher with said sleeve, a spindle extended through said hollow shaft and within said hollow upright, and gearing connecting said spindle with said sleeve to move said pusher by rotation of said spindle.

5. In a machine for removing tires, in combination, means for engaging the rim of a wheel to hold the latter stationary, a pusher for engaging the tire on said rim, mechanism for rotating the pusher around and relatively to said rim, and mechanism cooperating with the first mechanism and actuated thereby for effecting a movement of the pusher transversely of said rim during the rotation of the pusher around the rim.

6. In a machine for removing tires, in combination, means for engaging the rim of a wheel, a pusher to engage the tire on said rim, a sleeve to which said pusher is connected, a support upon which said sleeve is mounted to turn and to move lengthwise thereon, and means for effecting simultaneous rotary and longitudinal movements of said sleeve and pusher with relation to said support.

7. In a machine for removing tires, in combination, means for engaging the rim of a wheel, a pusher to engage the tire on said rim, a sleeve to which said pusher is connected, a support for said sleeve, means for effecting simultaneous rotary and longitudinal movements of said sleeve and pusher, a nut in threaded engagement with said sleeve, and means for connecting said nut with said pusher to adjust the latter to the tire by rotation of said nut.

8. In a machine for removing tires, in combination, means for engaging the rim of a wheel to hold the latter stationary, a pusher for engaging the tire on said rim, mechanism for rotating the pusher around and relatively to said rim, and mechanism for automatically effecting a movement of the pusher transversely of said rim during the rotation of the pusher around the rim.

In testimony whereof, I have signed my name to this specification.

DAVID S. HERSHON.